H. JAMES.
Shaft-Coupling.

No. 213,660. Patented Mar. 25, 1879.

Witnesses:
A. B. Robertson
W. W. Hollingsworth

Henry James,
Inventor,
By T. J. W. Robertson,
Attorney.

UNITED STATES PATENT OFFICE.

HENRY JAMES, OF HUDSON, NEW YORK.

IMPROVEMENT IN SHAFT-COUPLINGS.

Specification forming part of Letters Patent No. 213,660, dated March 25, 1879; application filed February 7, 1879.

*To all whom it may concern:*

Be it known that I, HENRY JAMES, of the city of Hudson, in the county of Columbia and State of New York, have invented certain new and useful Improvements in Shaft-Couplings; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1:
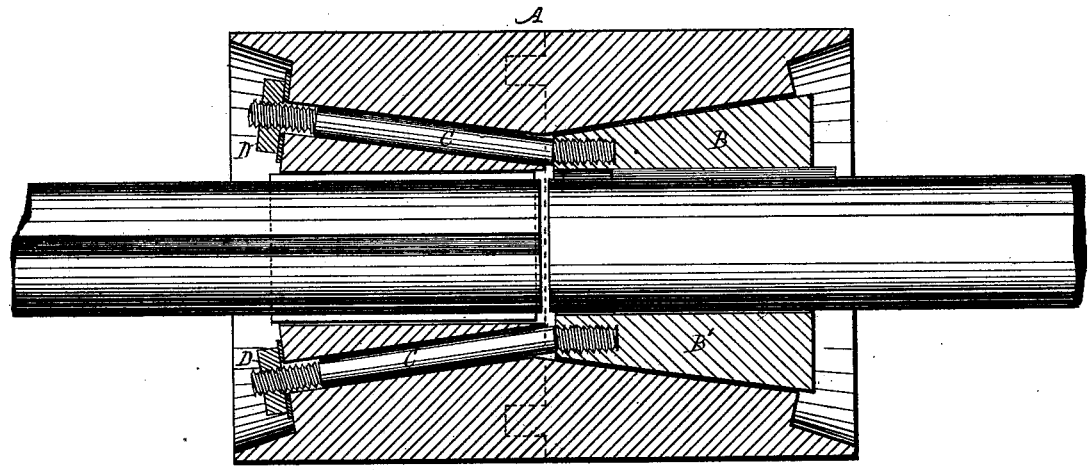
Figure 2:
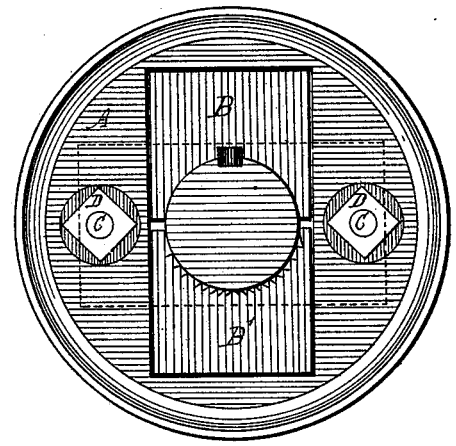

Figure 1 is a vertical section, and Fig. 2 an end view.

This invention relates to that class of shaft-couplings which act by compression to securely hold the ends of the shafting together.

It consists, mainly, in the use of a sleeve provided with tapering recesses, usually set at right angles to each other, in which are fitted wedges of corresponding taper, having bolts or screw-rods, by which said wedges can be drawn inward, so as to contract the opening, and thus compress and tightly hold the abutting ends of two pieces of shafting.

In the drawings, A A represent the sleeve or shell, having two tapering recesses at right angles to each other, preferably a little wider than the diameter of the shafting to be coupled, in each of which are fitted two tapering wedges, B B, having one of their faces provided with semicircular cavities to fit the shaft.

Attached to the wedges are rods C C, passing through holes in the sleeve A, and having their outer extremities threaded and provided with nuts D D, by which the wedges are drawn inward, and thereby caused to contract the opening through which the shafting passes, so as to securely hold and bind the shafting to be coupled.

The rods may be either screwed fast or cast in the wedges, and provided with nuts, as described, or they may be ordinary headed bolts, screwing into the wedges, or passing through both shell and wedges, with nuts to tighten the coupling; or, if preferred, each wedge and rod may be forged in one piece or cast of malleable iron.

As an additional protection against the shaft turning in the coupling, the wedges may be provided with seats for keys, to be driven in the usual manner.

Instead of having key-seats, the wedges may be made of steel, having sharp-edged ribs, as shown at B', which would securely hold the shafting without keys.

I prefer to make the sleeve or shell in one piece; but, if desired, for convenience in manufacture, it may be made in two pieces, as shown by dotted lines, in which case lugs may be cast on one piece to fit into corresponding recesses in the other.

Although I prefer to use two keys in each end of the sleeve, yet it is obvious that one at each end may be used if one side of each of the recesses is cast concave.

By either of the plans of construction above set forth, couplings of great power and security may be made at very small cost.

The strength is much increased by the use of the solid part at each end to receive the whole strain of the screw in drawing the wedge home. By arranging the ribs on the wedges parallel with their line of motion or the direction in which they are drawn, the ribs will more readily cut into the shaft than if they are simply pressed on the shaft.

By arranging the recesses at right angles to each other, the bolts can be passed through the solid portions of the sleeve, on the end of the sleeve opposite that by which the wedges enter, so as to allow the nut to act on solid portions of the ends of the sleeve without making its diameter inconveniently large, whereby much weight of iron is saved.

By providing the tapering wedges with rods or screws arranged to pass through the opposite end of the sleeve from which they enter, the wedges can, if preferred, be both driven in and out of the sleeve by an ordinary hammer, without other tools.

What I claim as new is—

1. A shaft-coupling composed of a shell or sleeve, A, provided with recesses diminishing toward the center, combined with tapering wedges having rods or screws passing through the solid part of the face of the opposite end of the shell or sleeve, substantially as and for the purposes described.

2. A shaft-coupling consisting of a shell or sleeve made in two parts, each having a tapering recess, and one of which has a lug or lugs fitting into corresponding cavities in the other, in combination with the tapering wedges B B′, provided with the screw-rods or bolts C C, substantially as described.

3. A shaft-coupling consisting of the shell or sleeve A, provided with two tapering recesses and bolt-holes, each provided with its appropriate wedges and bolts, and arranged at right angles to each other, substantially as described.

4. A sleeve, A, having a tapering recess at one end, diminishing toward the center, connected with bolt-holes passing through the solid portions of the opposite end, and adapted to receive a tapering wedge provided with a rod or screw at its smaller end, passing through the bolt-holes, substantially as described.

HENRY JAMES.

Witnesses:
DANIEL B. DOWNING,
GEORGE H. TUTOR.